United States Patent [19]
Venema

[11] Patent Number: 5,654,083
[45] Date of Patent: Aug. 5, 1997

US005654083A

[54] COPOLYESTER-CONTAINING PLASTIC SHEET A PROCESS FOR THE MANUFACTURING OF THE PLASTIC SHEET AND MOLDED ARTICLES MANUFACTURED FROM THE PLASTIC SHEET

[75] Inventor: Gertjan Venema, Pittem, Belgium

[73] Assignee: AXXIS N.V., Tielt, Belgium

[21] Appl. No.: 423,357

[22] Filed: Apr. 18, 1995

[30] Foreign Application Priority Data

Apr. 18, 1994 [BE] Belgium .................... 09400393

[51] Int. Cl.$^6$ .................... B32B 7/00; B32B 27/06; B32B 27/36; B32B 31/30
[52] U.S. Cl. .................... 428/215; 428/216; 428/334; 428/480; 264/173.12; 264/173.16
[58] Field of Search .................... 428/215, 216, 428/334, 480; 264/177.1, 173.12, 173.16

[56] References Cited

U.S. PATENT DOCUMENTS

| | | | |
|---|---|---|---|
| 4,600,647 | 7/1986 | Robeson et al. | 428/480 |
| 4,948,666 | 8/1990 | Paul et al. | 428/334 |
| 5,108,835 | 4/1992 | Hähnsen et al. | 428/412 |
| 5,387,458 | 2/1995 | Pavelka et al. | 428/480 |
| 5,480,926 | 1/1996 | Fagerburg et al. | 428/480 |

FOREIGN PATENT DOCUMENTS

| | | | |
|---|---|---|---|
| 0000431 | 1/1979 | European Pat. Off. | 428/334 |
| A10320632 | 6/1989 | European Pat. Off. | |

OTHER PUBLICATIONS

Database WPI, Week 8601, Derwent Publications Ltd., London, GB.
Database WPI, Week 8723, Derwent Publications Ltd., London, GB.
Database WPI, Week 8120, Derwent Publications Ltd., London, GB.

*Primary Examiner*—Peter A. Szekely
*Attorney, Agent, or Firm*—Cushman Darby & Cushman IP Group of Pillsbury Madison & Sutro, LLP

[57] ABSTRACT

A plastic sheet including at least a core section and at least one surface layer on the core section. The core section contains a copolyester containing at least 45–50 mole % monomer units derived from a first aliphatic diol, 45–50 mole % derived from a first aromatic dicarboxylic acid, and 0.5–5 mole % monomer units derived from a second aliphatic diol and/or a second aromatic dicarboxylic acid. Each surface layer has a thickness of 2–100 μm and contains the copolyester and 1–15 wt. % of a UV light-absorbing additive. The present invention excludes, however, plastic sheets having a core section and surface layer containing a copolyester that contains 50 mole % monomer units derived from terephthalic acid, 49.5–45 mole % monomer units derived from ethylene glycol, and 0.5–5 mole % monomer units derived from cyclohexane dimethanol. The plastic sheet of the present invention has a lower rate of crystallization, better surface quality and better resistance to solvents than conventional sheets.

10 Claims, 1 Drawing Sheet

COPOLYESTER-CONTAINING PLASTIC SHEET A PROCESS FOR THE MANUFACTURING OF THE PLASTIC SHEET AND MOLDED ARTICLES MANUFACTURED FROM THE PLASTIC SHEET

BACKGROUND OF THE INVENTION

1. Field of the Invention

The present invention relates to a plastic sheet, and in particular to a plastic sheet comprising a copolyester which contains 45–50 mole % monomer units derived from a first aliphatic diol, 45–50 mole % monomer units derived from a first aromatic dicarboxylic acid, and 0.5–5 mole % monomer units derived from a second aliphatic diol and/or a second aromatic dicarboxylic acid. The present invention further relates to molded articles containing the plastic sheet of the present invention.

2. Description of the Related Art

Since the aforementioned copolyester contains a minor amount of the comonomers, the copolyester exhibits a low crystallization rate in comparison with a polyester that does not contain the comonomers. As a result, it is generally possible to extrude the copolyester to a plastic sheet having high luminous transmittance and low haze.

A disadvantage in utilizing this plastic sheet, however, is that the copolyester crystallizes during manufacture of the sheet, especially if the sheet is thick, resulting in inadequate luminous transmittance and unacceptable haze of the plastic sheet. Furthermore, the plastic sheet can be shaped into end products at elevated temperature only to a limited extent without the copolyester crystallizing. As a result, during the shaping process, the luminous transmittance of the sheet decreases and the haze of the plastic sheet increases.

It is, therefore, an object of the present invention to provide a plastic sheet that does not have the aforementioned disadvantages or at least reduces the magnitude of the aforementioned disadvantages.

SUMMARY OF THE INVENTION

The plastic sheet according to the invention comprises a core section and at least one surface layer formed on at least one surface of the core section. The core section contains a copolyester comprising 45–50 mole % monomer units derived from a first aliphatic diol 45 to 50 mole % monomer units derived from a first aromatic carboxylic acid, and 0.5 to 5 mole % monomer units derived from a second aliphatic diol and/or a second aromatic dicarboxylic acid. The surface layer has a thickness of 2–100 μm and contains the copolyester and 1–15 wt. % of a UV light-absorbing additive. This ensures a lower crystallization rate of the copolyester in the plastic sheet according to the present invention than in conventional plastic sheets. Excluded from the present invention are plastic sheets whose core section and surface layer contain a copolyester that contains 50 mole % monomer units derived from terephthalic acid, 49.5–45 mole % monomer units derived from ethylene glycol and 0.5–5 mole % monomer units derived from cyclohexane dimethanol. Such a plastic sheet is disclosed in unprepublished European patent application Ser. No. 93202953.1.

A further advantage of the plastic sheet of the present invention is that the plastic sheet exhibits fewer matt stains on the surface. Most conventional plastic sheets have matt stains on their surfaces, particularly in the case where the conventional sheets have small sheet thicknesses. These stains develop during extrusion of the plastic sheet. In accordance with the present invention, however, such matt stains hardly develop, if at all, during the extrusion of the plastic sheet of the invention.

Another advantage of the plastic sheet of the present invention is that the plastic sheet is more resistant to solvents such as acetone.

In addition, the plastic sheet of the present invention exhibits good weather resistance, and good optical and mechanical properties. Moreover, the plastic sheet is readily recyclable, and a good bond exists between the surface layer and the core section of the plastic sheet.

DETAILED DESCRIPTION OF THE INVENTION

The term sheet as used in this application should be understood to mean a body whose thickness is small in comparison with its length and width, and whose thickness is at least 0.3 mm. A sheet having a thickness of less than 0.3 mm is too flexible. The term sheet should also be taken to include a twin-wall sheet. The sheet may be flat or curved, and can include, for instance, a corrugated sheet. Surfaces of the sheet refers to the two outside surfaces that are at right angles to the thickness direction. The thickness of the sheet is preferably between 0.5 and 10 mm, and more preferably between 0.7 and 5 mm. The surface layer may be present on only one surface of the plastic sheet or on both surfaces of the plastic sheet. Such a plastic sheet, however, may be exposed to the weather only with the surface where the surface layer is present. Preferably, the surface layer is present on both surfaces of the plastic sheet.

As the copolyester contained in the core section and the copolyester contained in the surface layer, any copolyester satisfying the above-mentioned requirements can be selected. The copolyesters of the core section and surface layer can be chosen independently of one another. However, the core section and the surface layer preferably contain the same copolyester. This results in an improved bond between the core section and the surface layer and even better recyclability.

The best results are obtained if the copolyester contains 47–50 mole % monomer units derived from the first aliphatic diol, 47–50 mole % monomer units derived from the first aromatic dicarboxylic acid, and 1–3 mole % monomer units derived from the second aliphatic diol and/or the second aromatic dicarboxylic acid.

Ethylene glycol is preferably selected as the first aliphatic diol and terephthalic acid is preferably selected as the first aromatic dicarboxylic acid.

Isophthalic acid is preferably selected as the second aromatic dicarboxylic acid.

In principle, any UV light-absorbing additive suited for use in the thermoplastic polyesters or copolyesters may be used in the plastic sheet of the invention, including, for example, those mentioned in DE-A-2853631, EP-A-247480, EP-A-320632, U.S. Pat. No. 4,859,726, and Plastics Additives Handbook, 3rd edition, Hanser Publishers of Munich, (1990), page 176 et seq.

Figure 1:
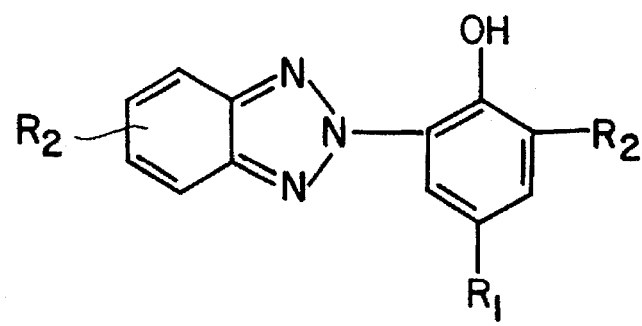
FIGS. 1–3 are schematic views of UV light-absorbing additives suitable for the present invention.

As the UV light-absorbing additive, use is preferably made of a benzotriazole or a benzophenone. Use may be made of, for example, 2-hydroxyphenylbenzotriazoles according to the first general formula shown in FIG. 1. In accordance with this first formula:

$R_1$ is an alkyl group having 1–18 carbon atoms or an arylalkyl group having 18 carbon atoms; and $R_2$ is a hydrogen or chlorine atom or an alkyl group having 1–18 carbon atoms or an arylalkyl group having 7–18 carbon atoms.

Figure 2:
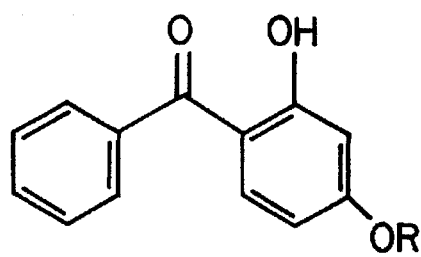

Examples of benzophenones that are suited for use in the sheet according to the invention are represented by the second general formula shown in FIG. 2, in which R is a hydrogen atom or an alkyl group having 1–12 carbon atoms.

Figure 3:
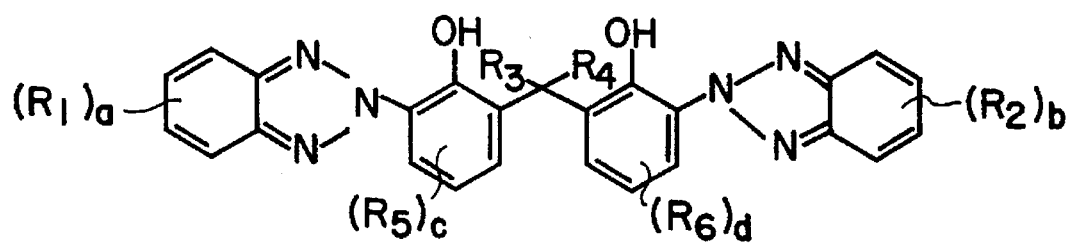

Preferably, a benzotriazole having 2 benzotriazole groups in the molecule, for example those represented by the third general formula shown in FIG. 3, is used in the present invention. In accordance with this third formula:

$R_1$ and $R_2$ are the same or different and are a hydrogen atom or a halogen atom, an alkyl group having 1–10 carbon atoms, a cycloalkyl group having 5–10 carbon atoms, an arylalkyl group having 7–13 carbon atoms, an aryl group having 6–14 carbon atoms, $OR_7$ or —$COOR_7$;

$R_7$ is a hydrogen atom or an alkyl group having 1–10 carbon atoms, a cylcoalkyl group having 5–10 carbon atoms, an arylalkyl group having 7–13 carbon atoms, or an aryl group having 6–14 carbon atoms;

$R_3$ and $R_4$ are the same or different and are a hydrogen atom, an alkyl group having 1–15 carbon atoms, a cycloalkyl group having 5 or 6 carbon atoms, an arylalkyl group having 7–20 carbon atoms, or an aryl group having 6–14 carbon atoms.

$R_5$ and $R_6$ are the same or different and are an alkyl group having 2–15 carbon atoms, a cycloalkyl group having 5–10 carbon atoms, an arylalkyl group having 7–20 carbon atoms, an aryl group having 6–14 carbon atoms, —$OR_7$, or —$COOR_7$.

a, b are the same or different and are 1, 2, 3 or 4; and c, d are the same or different and are 1, 2 or 3.

Benzotriazoles with 2 benzotriazole groups per molecule possess a high molecular weight and, in consequence, evaporate or migrate less rapidly from the plastic sheet than do the UV light-absorbing additives having a lower molecular weight.

The plastic sheet can be manufactured by coextruding or calendering a plastic sheet which contains the copolyester and pressing onto the sheet just before the sheet is cooled a surface film of thickness 2–100 µm which contains the copolyester and the UV light-absorbing additive.

The plastic sheet is preferably manufactured by coextruding the layer or the surface layers which contain the copolyester and the UV light-absorbing additive and the remaining part of the sheet (i.e., the core section) in one step. Such a plastic sheet possesses even better optical properties and there exists an even better bond between the surface layer and the core section of the sheet.

The plastic sheet may contain the usual additives, such as lubricants, antioxidants, optically active additives, antistatic agents and coloring agents.

The plastic sheet can be processed into shape articles by, for example, working the plastic sheet at elevated temperature, by bending or folding the at elevated temperature or at ambient temperature, or possibly by machining, for instance cutting and sawing, the sheet at ambient temperature.

The present invention also relates to shaped articles wholly or partially manufactured from the plastic sheet according to the invention. Such articles include, by way of example, covers, skylights, glazing for greenhouses and buildings, advertising signs and displays.

EXAMPLE I, COMPARATIVE EXAMPLE A

Preparation of the samples:

A compound X was prepared by hot-melt-compounding and mixing a mixture of 92-wt. % PET copolymer containing 3 mol.% isophthalic acid and having an IV (intrinsic viscosity) of 0.84 dl/g and 8 wt. % of the UV light-absorbing additive bis(2-hydroxy-5-t-octyl-3-(benzotriazole-2-yl) phenyl)-methane in a twin-screw extruder in the usual manner.

Plastic sheets I, 2 mm thick and 1270 mm wide, were produced by means of a coextrusion process in the usual manner. The plastic sheets were made up of a core section and two surface layers. The core section consisted of the aforementioned PET copolymer, whereas the surface layers consisted of the aforementioned compound X. The surface layers were 40 µm thick.

Plastic sheets A, having the same dimensions as the sheets I, were produced in the usual manner using the same procedures as those in which the plastic sheets I had been produced, except that only the main extruder was used so that the plastic sheets A did not contain the surface layer but consisted solely of the core section. The plastic sheets A were produced by extruding a mixture of 96 wt. % of the PET copolymer and 4 wt. % of the compound X. This means that the plastic sheets were 99.7 wt. % PET copolymer and 0.3 wt. % UV light-absorbing additive.

Tests conducted on the plastic sheets

1) Crystallization behavior

Test coupons of 5×5 cm were taken from the extruded plastic sheets. The test coupons were placed in a circulating-air oven at a number of different temperatures. For each temperature the residence time in the furnace until crystallization was seen to begin, as evidenced by the coupons beginning to show some haziness, was determined.

The residence time until crystallization was complete also was determined. This is the residence time needed for crystallization to progress to the point where light transmission of the coupon is almost completely lost and no further change is observed. The results are given in Table 1.

2) Environmental stress cracking

The susceptibility to environmental stress cracking was determined by bending test coupons from plastic sheets I and A at room temperature through an angle of 180° and then immersing them in acetone. The results are given in Table II.

3) Weather resistance

Test coupons were taken from the plastic sheets A and I. The test coupons were subjected to accelerated ageing in a QUV Accelerated Weathering Tester (TM) supplied by Q-Panel Company of the USA and equipped with QUV-B313 lamps. The ageing cycle consisted of 4 hours UV irradiation at 60° C. alternated with 4 hours condensation at 50° C.

After the coupons had been subjected to accelerated ageing for 0, 100 and 250 hours, the Yellowness Index (YI) as determined by ASTM D 1925, the luminous transmittance (LT) and the impact strength measured with the aid of an instrumented falling dart energy meter were determined.

The falling dart test was conducted using an Impact (TM) II apparatus supplied by Messrs J&B of the Netherlands. The dart had a round tip 10 mm in diameter and the samples were clamped in two ring-shaped clamps with an inside diameter of 40 mm.

The weight of the dart was 23 kg and the dropping height was 1 m. This test was conducted so as to determine the Maximum Load Energy, which is the amount of energy absorbed by the sample at the point where the recorded force reaches its maximum value. The results are given in Table 3.

TABLE 1

| Temperature | Time to beginning of crystallization | | Time to complete crystallization | |
|---|---|---|---|---|
| | I | A | I | A |
| 160° C. | 57 sec | 44 sec | 103 sec | 82 sec |
| 150° C. | 72 sec | 53 sec | 126 sec | 110 sec |
| 140° C. | 91 sec | 78 sec | 173 sec | 145 sec |
| 130° C. | 120 sec | 99 sec | 195 sec | 157 sec |
| 120° C. | 205 sec | 190 sec | 311 sec | 281 sec |

Table 1 shows that plastic sheet I of the present invention crystallizes slower than the known plastic sheet A.

Furthermore, plastic sheet A contains several matt stains on the surface whereas plastic sheet I of the present invention contains hardly any discernible matt stains.

TABLE 2

| | Submersion of cold-folded test sample in acetone | |
|---|---|---|
| | I | A |
| Observation after 5 min | no fracture | fracture |
| Observation after 24 h | no fracture | fracture |

Table 2 shows that plastic sheet I of the invention is well resistant to acetone and that the known sheet A is not.

TABLE 3

| | Ageing | | |
|---|---|---|---|
| Plastic sheet | 0 hours | 100 hours | 250 hours |
| | YI | | |
| I | 2.5 | 2.6 | 3 |
| A | 2.8 | 4.0 | 4.3 |
| | LT % | | |
| I | 87.4 | 87.0 | 86.8 |
| A | 87.5 | 85.9 | 85.1 |
| | MLE (J) | | |
| I | 10 | 10 | 10 |
| A | 10 | 2 | 2 |

Table 3 shows that sheet I of the invention yellows less rapidly, loses its luminous transmittance less rapidly and better retains its impact strength than comparative sheets A.

I claim:

1. A plastic sheet comprising:
   a core section comprising a copolyester containing at least 40–50 mole % monomer units derived from a first aliphatic diol, 45–50 mole % monomer units derived from a first aromatic dicarboxylic acid, and 0.5–5 mole % monomer units derived from at least one member selected from the group consisting of a second aliphatic diol and a second aromatic dicarboxylic acid; and
   at least one surface layer formed on at least one surface of said core section and having a thickness of 2–100 μm, said at least one surface containing at least said copolyester and 1–15 wt. % of a UV light-absorbing additive, wherein said plastic sheet has a thickness of at least 0.3 mm, and further wherein said core section and said at least one surface layer are prepared by coextrusion and do not contain a copolyester that contains 50 mole % monomer units derived from terephthalic acid, 49.5–45 mole % monomer units derived from ethylene glycol, and 0.5–5 mole % monomer units derived from cyclohexane dimethanol.

2. A plastic sheet according to claim 1, wherein said core section contains said surface layer on both surfaces thereof.

3. A plastic sheet according to claim 1, wherein said core section and said surface layer contain the same copolyester.

4. A plastic sheet according to claim 1, wherein said copolyester contains 47–50 mole % of said monomer units derived from said first aromatic dicarboxylic acid and 1–3 mole % of said monomer units derived from said at least one member selected from the group consisting of said second aliphatic diol and said second aromatic dicarboxylic acid.

5. A plastic sheet according to claim 1, wherein said first aliphatic diol is ethylene glycol and said first aromatic dicarboxylic acid is terephthalic acid.

6. A plastic sheet according to claim 1, wherein said second aromatic dicarboxylic acid is isophthalic acid.

7. A plastic sheet according to claim 1, wherein said UV light-absorbing additive is selected from the group consisting of a benzotriazole and a benzophenone.

8. A plastic sheet according to claim 7, wherein said benzotriazole contains two benzotriazole groups.

9. A process for the manufacture of a plastic sheet according to claim 1, said process comprising obtaining the plastic sheet by coextrusion.

10. A molded article comprising the plastic sheet according to claim 1.

* * * * *